Figure 1:
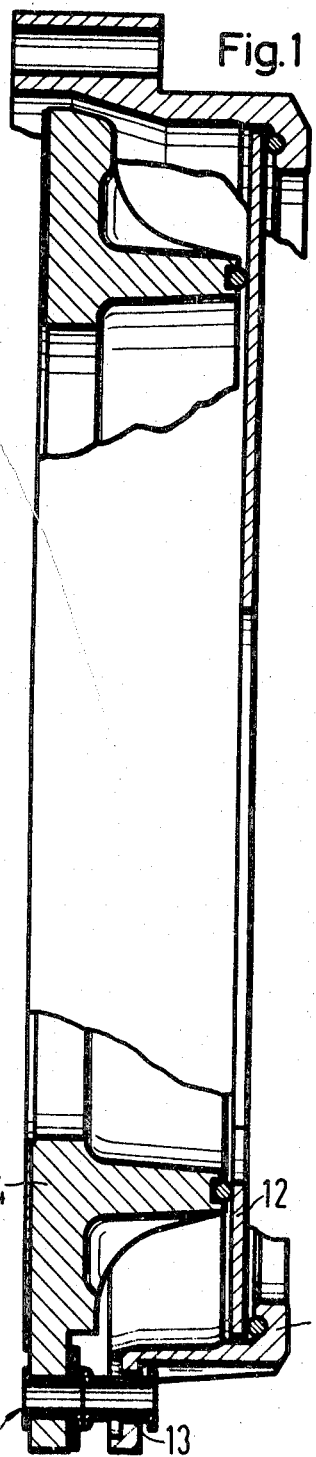

United States Patent
Spichala

[15] 3,640,361
[45] Feb. 8, 1972

[54] FRICTION CLUTCH ASSEMBLY
[72] Inventor: Paul Spichala, Schweinfurt, Germany
[73] Assignee: Fichtel & Sachs AG, Schweinfurt, Germany
[22] Filed: May 11, 1970
[21] Appl. No.: 35,951

[30] Foreign Application Priority Data
May 20, 1969 Germany..................G 69 20 201

[52] U.S. Cl..................192/70.18, 192/89 B, 29/437, 29/512, 85/70
[51] Int. Cl.........................................F16d 13/58
[58] Field of Search..................192/70.17, 70.18, 89 B; 29/437, 512; 85/70; 188/218 XL

[56] References Cited

UNITED STATES PATENTS

| | | | |
|---|---|---|---|
| 2,253,344 | 8/1941 | Nutt et al. | 192/70.18 |
| 3,489,256 | 1/1970 | Binder et al. | 192/70.18 X |
| 2,170,011 | 8/1939 | Conner | 29/512 X |
| 1,962,793 | 6/1934 | Vogel | 29/512 UX |
| 2,562,336 | 7/1951 | Selden | 85/70 |
| 2,673,336 | 3/1954 | Peters | 85/70 X |
| 3,396,824 | 8/1968 | Meier | 188/72.5 |

*Primary Examiner*—Allan D. Herrmann
*Attorney*—Kelman and Berman

[57] ABSTRACT

In a friction clutch in which the pressure plate is secured to the clutch casing by leaf springs normally extending in a common radial plane and elongated approximately tangentially to a circle about the clutch axis, the springs are fastened to the pressure plate, and axial movement of the pressure plate relative to the casing under the pressure of the clutch spring is limited by tubular fasteners passing through openings in the plate, the leaf springs, and the casing. The fasteners have terminal flanges and a central annular bead, the pressure plate and a spring are confined between one flange and the bead, and the casing is free to move between the bead and the other flange on each fastener.

9 Claims, 2 Drawing Figures

PATENTED FEB 8 1872

3,640,361

FRICTION CLUTCH ASSEMBLY

This invention relates to friction clutch assemblies, and particularly to the fastening arrangements which connect a pressure plate and a clutch casing in a clutch assembly of the type disclosed in the commonly owned U.S. Pat. No. 3,489,256 to Richard Binder et al.

In the known assembly, the clutch casing and the pressure plate are movable relative to each other in the direction of the clutch axis while they are connected for joint rotation about the axis by means of leaf springs circumferentially distributed about the clutch axis, elongated tangentially relative to a common circle about the axis, and extending approximately in a common radial plane. The pressure plate and clutch casing are urged axially away from each other by a clutch spring, more specifically a diaphragm spring, strong enough to break the leaf springs, and relative axial movement of the plate and casing must therefore be limited by stops. It is known to secure the leaf springs to the pressure plate by fasteners which extend through axial openings in the casing and have enlarged heads at the far side of the casing, thereby limiting movement of the casing away from the pressure plate under the force of the clutch spring.

It has recently been found advantageous to use aluminum alloys as materials of construction for the pressure plate and the fasteners employed heretofore, when modified to make them suitable for firm anchorage in the relatively soft metal of the plate have been found to be relatively costly. Moreover, they can be installed and removed only by skilled and careful craftsmen, and their performance during normal operation may leave something to be desired.

It is an object of the invention to provide inexpensive and reliable fasteners suitable for attaching the aforedescribed leaf springs to an aluminum pressure plate and for protecting the leaf springs against damage by excessive relative axial movement of the pressure plate and of the clutch casing.

Another object is the provision of fasteners which do not require particular skill or caution on the part of workmen installing or removing the clutch assembly.

With these and other objects in view, as will hereinafter become apparent, the invention provides a clutch assembly of the type described with unitary, elongated fasteners passing through openings of the pressure plate and of respective leaf springs in direct contact with the light metal of the plate. The plate and springs are held in fixed relationship longitudinally of the fastener between a radial flange on a longitudinally terminal portion of each fastener and an annular bead on a portion of the fastener intermediate the longitudinal ends of the same. The fastener also passes freely through an opening in the clutch casing, and the latter may move relative to the fastener between the aforementioned bead and another flange on the other longitudinally terminal end portion, the cross sections of the flanges and of the bead being greater than corresponding dimensions of the associated openings.

Figure 2:
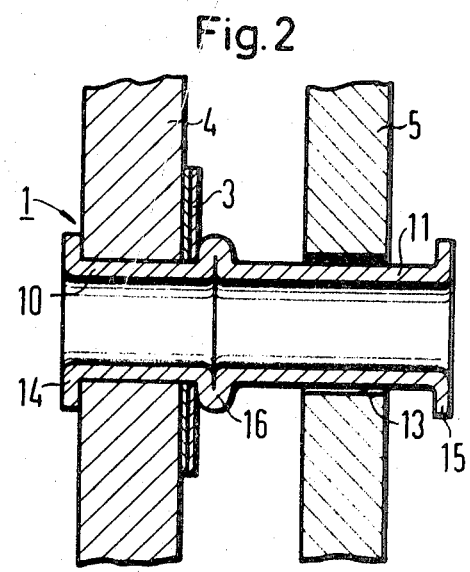

Other features, additional objects, and many of the attendant advantages of this invention will readily be appreciated as the same becomes better understood by reference to the following detailed description of a preferred embodiment when considered in connection with the appended drawing in which:

FIG. 1 shows a friction clutch assembled according to this invention in a fragmentary, axially sectional view; and FIG. 2 shows a portion of the device of FIG. 1 on a larger scale.

Referring now to the drawing in detail, there is shown only as much of a clutch assembly of the aforementioned known type as is needed for an understanding of this invention, the omitted features being described more fully in the Binder et al. patent referred to above.

The illustrated known elements of the clutch include an annular casing 5 and a pressure plate 4 of aluminum alloy. The outer circumference of a radially slotted diaphragm spring 12 abuts from the inside against the casing 5, and an annular portion of the spring inwardly offset from the outer circumference abuts against the pressure plate 4 and tends to move the plate 4 and casing 5 apart in the direction of the clutch axis.

In the assembled condition of the hub, openings in the casing 5 receive screws which fixedly fasten the casing to the flywheel of an associated engine, and the diaphragm spring 12 drives the pressure plate toward the flywheel and a friction disc mounted on the output shaft of the clutch and axially movable between the flywheel and the pressure plate. The diaphragm spring 12 is shown in FIG. 1 in the tensioned shape normally assumed when the illustrated clutch elements are assembled with the nonillustrated flywheel, friction disc, and output shaft.

The pressure plate 4 is secured to the casing 5 by three laminated leaf springs 3 equiangularly distributed about the clutch axis approximately in a common radial plane, and elongated approximately tangentially to a common circle about the axis, only one longitudinal end of one spring 3 being visible in the drawing, the other end being secured to the casing 5 by a rivet (not shown). The structure described so far is known, and its operation is well understood.

Each of the springs 3 is attached to the pressure plate 4 by a fastener 1 in a manner shown in more detail in FIG. 2. The fastener is a unitary, tubular piece of steel or other metal much harder than the material of the pressure plate 4 which mainly consists of aluminum. The two longitudinal ends of the fastener 1 are flanged and a portion of the fastener intermediate the two terminal flanges 14, 15 is upset so as to form an outwardly projecting annular bead 16. The tubular, cylindrical portion 10 of the fastener between the flange 14 and the bead 16 is shorter than the portion 11 between the bead 16 and the other flange 15 and is conformingly received in respective aligned openings of the pressure plate 4 and the spring 3 in direct contact with the aluminum alloy of the plate and the steel of the spring.

The tubular cylindrical portion 11 of the fastener 1 is practically identical in cross section with the portion 10, and is received with ample clearance in a bore 13 of the clutch casing 5. The length of the bore 13 is much smaller than the length of the fastener portion 11 so that the casing may move relative to the fastener 1 and to the pressure plate 4 between the bead 16 and the flange 15. The cross sections of the flanges 14, 15 and of the bead 16 are much greater than that of the bores in the plate 4, the spring 3, and the casing 5, whereby the pressure plate 4 and the spring 3 are fastened to each other in fixed relationship longitudinally of the fastener 1 and axially of the clutch, and the relative movement of the pressure plate 4 and of the clutch casing 5 is limited to the difference between the length of the fastener portion 11 and the corresponding dimension of the bore 13.

The fastener 1 is prepared from a section of cylindrical tubing by first upsetting one end of the section to form the flange 14. The straight end of the fastener 1 is then slipped through the bores of the pressure plate 4 and the spring 3 which are dimensioned for a sliding fit, no particular precision in cross-sectional dimension being required. The bead 16 is thereafter formed in another upsetting operation, the diaphragm spring 12 and the clutch casing 5 are installed, and the flange 15 is formed last by upsetting while the diaphragm spring is compressed in a suitable fixture. As is inherent in this method and shown in FIG. 2, the two longitudinal, coaxial portions of the fastener 1 intermediate the bead 16 and the flanges 14, 15 respectively are of uniform and equal cross section, and the radial wall thickness of these portions is practically equal to the axial thickness of the flanges 14, 15 and to one-half the axial thickness of the bead 16. Handtools for forming the flanges 14, 15 and the bead 16 are commonly available or are readily improvised where not available.

The bead 16 substantially increases the stiffness of the fastener 1 so that relatively thin-walled tubing may be employed as a starting material. The centrifugal forces which act on the fastener portion 11 during operation of the clutch at high rotary speeds are very small because of the tubular nature of the fastener and the thinness of its walls. The fastener therefore does not tend to bend away from the axis of rotation, as has been observed with fasteners used heretofore, and cannot interfere with relative axial movement of the casing 5 and of the pressure plate 4.

The cost of the tubular fasteners of the invention is significantly lower than that of the fasteners used heretofore for the same purpose, and generally consisting of two or usually three elements, such as a steel bushing in the bore of the light-metal plate 4, a tubular rivet partly received in the bushing and fastening the spring 3 to the plate 4, and a pin having an enlarged head and a shank partly received in the bore and secured to the tubular rivet either by threads or by a shoulder and an upset flange.

The flange 15, as the corresponding elements of the known fasteners is not needed while the clutch assembly is attached to the flywheel of an engine as described above. It protects the leaf springs 3 in the clutch assembly prior to installation in a vehicle and the like, and during repairs when the clutch is to be removed from the flywheel. The tubular fasteners of the invention have walls thin enough to permit the bead 16 to be formed under relatively light upsetting pressure too low to cause damage to the aluminum pressure plate 4 which is protected by the spring 3. The use of steel bushings in the plate is therefore unnecessary.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. In a friction clutch assembly having an axis and including a casing and a pressure plate arranged for rotation about said axis, a leaf spring for circumferentially connecting said pressure plate to said casing, a clutch spring operatively interposed between said casing and said plate and urging the casing and plate to move axially apart, and fastening means securing said leaf spring to said pressure plate and limiting the relative axial movement of said pressure plate and of said casing, the improvement in the fastening means which comprises:
   a. a unitary, elongated, tubular fastening member having a longitudinal axis and sequentially passing through respective openings of said pressure plate, of said leaf spring, and of said casing;
   b. integral, radial flanges on the two longitudinally terminal portions of said fastening member respectively adjacent said pressure plate and said casing,
      1. the cross sections of said flanges being greater than the cross sections of the respective adjacent openings in said pressure plate and in said casing; and
   c. an integral annular, outer bead on a longitudinal portion of said fastening member interposed between said leaf spring and said casing,
      1. the cross section of said bead being greater than the cross section of said opening in said leaf spring.

2. In an assembly as set forth in claim 1, the longitudinal portions of said fastening member intermediate said bead and said flanges respectively being of uniform and equal cross section, the radial wall thickness of said longitudinal portions being substantially equal to the axial thickness of each of said flanges and to one-half the axial thickness of said bead.

3. In an assembly as set forth in claim 1, said fastening member being tubular over the entire length thereof.

4. In an assembly as set forth in claim 3, the portions of said fastening member intermediate said enlarged portions and received in said openings being thin-walled.

5. In an assembly as set forth in claim 3, said pressure plate essentially consisting of light metal, said fastening member making direct contact with said light metal in said opening of said pressure plate.

6. In an assembly as set forth in claim 5, said fastening member essentially consisting of a metal substantially harder than said light metal.

7. In an assembly as set forth in claim 1, said pressure plate and said leaf spring being confined between one of said flanges and said bead in fixed relationship longitudinally of said fastening member, and said casing being movable between said bead and the other flange.

8. In an assembly as set forth in claim 7, said pressure plate essentially consisting of light metal, said fastening member making direct contact with said light metal in said opening of said pressure plate, and said leaf spring being longitudinally interposed between said bead and said pressure plate, said fastening member and said leaf spring essentially consisting of metal substantially harder than said light metal.

9. In an assembly as set forth in claim 8, said one flange making direct contact with said light metal, said light metal essentially consisting of aluminum.

* * * * *